United States Patent [19]

Erickson et al.

[11] Patent Number: 5,694,820
[45] Date of Patent: Dec. 9, 1997

[54] TOOL UNIT CLAMPING APPARATUS HAVING IMPROVED SHORT STROKE LOCKING MECHANISM

[75] Inventors: Robert A. Erickson; Greg W. Needham, both of Raleigh, N.C.

[73] Assignee: Kennametal Inc., Latrobe, Pa.

[21] Appl. No.: 575,712

[22] Filed: Dec. 20, 1995

Related U.S. Application Data

[63] Continuation-in-part of Ser. No. 423,617, Apr. 17, 1995.
[51] Int. Cl.$^6$ .................................... B23C 5/26
[52] U.S. Cl. .................. 82/160; 409/232; 408/239 A; 279/75
[58] Field of Search ............... 82/158, 160; 279/30, 279/75, 82, 905; 407/89; 408/239 A, 239 R, 240; 409/232, 233, 234

[56] References Cited

U.S. PATENT DOCUMENTS

| | | | |
|---|---|---|---|
| 1,861,099 | 5/1932 | Smith | 279/75 |
| 2,926,020 | 2/1960 | Dayton et al. | 279/75 |
| 4,209,182 | 6/1980 | Sheldon | 279/75 |
| 4,708,040 | 11/1987 | Erickson | 82/36 B |
| 4,723,877 | 2/1988 | Erickson | 409/234 |
| 4,726,268 | 2/1988 | Erickson | 82/36 B |
| 4,726,269 | 2/1988 | Erickson | 82/36 B |
| 4,736,659 | 4/1988 | Erickson | 82/36 B |
| 4,747,735 | 5/1988 | Erickson et al. | 409/234 |
| 4,836,068 | 6/1989 | Erickson | 82/160 |
| 4,932,295 | 6/1990 | Erickson | 82/160 |
| 4,951,536 | 8/1990 | Robertson | 82/158 |
| 5,016,892 | 5/1991 | Lafforgue et al. | 279/82 |
| 5,173,017 | 12/1992 | Oshnock et al. | 409/234 |
| 5,193,954 | 3/1993 | Hunt | 409/233 |
| 5,245,896 | 9/1993 | Erickson et al. | 82/160 |
| 5,261,302 | 11/1993 | Erickson | 82/160 |
| 5,352,074 | 10/1994 | Ishikawa | 279/75 X |

FOREIGN PATENT DOCUMENTS

| | | | |
|---|---|---|---|
| 874855 | 4/1953 | Germany | 279/75 |
| 3606331 | 9/1987 | Germany | 279/75 |
| 4829331 | 3/1990 | Germany | 279/905 |

*Primary Examiner*—Daniel W. Howell
*Assistant Examiner*—Henry W. H. Tsai
*Attorney, Agent, or Firm*—James G. Porcelli; John J. Prizzi

[57] ABSTRACT

A short-stroke clamping apparatus for detachably connecting a tool unit to a tool supporter is provided of the type having a canister member which includes apertures for admitting spherical locking elements, and a lock rod that is reciprocally movable a stroke distance along an axis and which has cam portions for moving the spherical locking elements through the canister apertures into engagement with the tool unit. In the clamping apparatus, the canister member apertures are elongated along the stroke axis. This allows the spherical locking elements to move axially along the cam portions of the lock rod as well as radially, such that locking engagement can be achieved with a shorter axial stroke movement of the lock rod. The aperture walls may also be angled to allow even greater axial movement of the locking elements, which not only further shortens the lock rod stroke, but can increase the gripping force that the clamping apparatus applies to the tool unit. The shorter lock rod stroke in turn advantageously shortens the tool envelope, and increases both the rigidity and life of the spring package that withdraws the lock rod. The aperture walls may also be angled to improve the force of locking engagement between the locking elements and the tool unit.

14 Claims, 9 Drawing Sheets

TOOL UNIT CLAMPING APPARATUS HAVING IMPROVED SHORT STROKE LOCKING MECHANISM

This is a continuation-in-part based upon pending parent application Ser. No. 08/423,617, filed Apr. 17, 1995.

BACKGROUND OF THE INVENTION

This invention generally relates to an improved lock rod clamping apparatus for detachably connecting a tool unit to a tool supporter, and is particularly concerned with such an apparatus having a shortened lock rod stroke and improved gripping force.

Clamping mechanisms for detachably connecting a tool unit to a tool supporter are well known in the art. Such mechanisms are typically used in machining operations where the tool unit holds a cutting insert that is moved into and out of cutting engagement with a rotating metal workpiece. These mechanisms allow different tool units holding different cutting inserts to be quickly attached to and detached from the tool supporter which in turn is connected to a device that controls the movement of the tool unit with respect to the workpiece.

One of the most commercially successful clamping mechanisms includes a cylindrically-shaped canister member that is matable with the tubular end of a tool unit and which includes apertures for admitting locking elements into locking engagement with recesses present in the tool unit. The locking elements, which are typically spherical, are radially moved through the apertures in the canister member by means of a reciprocating lock rod having cam portions that engage the locking elements. Examples of such a clamping mechanism are disclosed in Erickson U.S. Pat. Nos. 4,708,040; 4,747,735; and 4,836,068, each of which is coassigned to Kennametal, Inc. located in Latrobe, Pa. and Krupp Widia GmbH.

Figure 6:
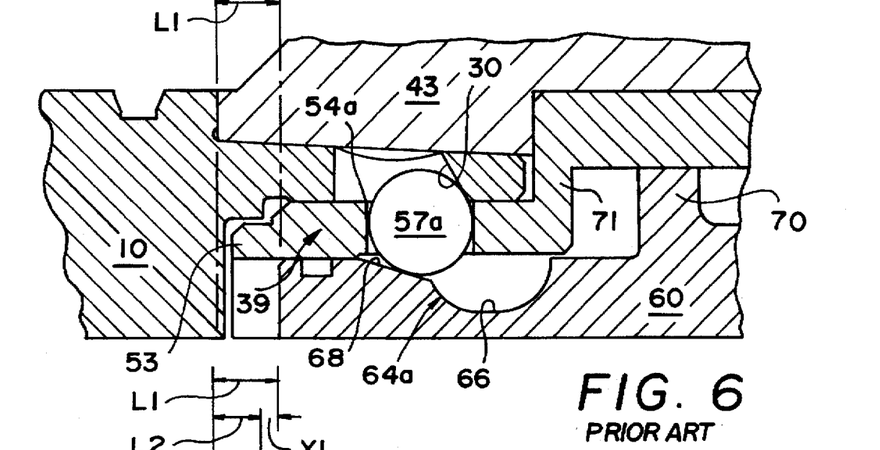
FIG. 6 is a partial enlarged cross-sectional side view of the canister member, spherical locking element, and cam portion of the lock rod of a prior art clamping mechanism, illustrating the length $L_1$ of the lock rod stroke necessary to bring the spherical locking element to a locking position.

Such a clamping mechanism is illustrated in FIG. 6. Here, a side cross-sectional view of the distal end 53 of a canister member 39 is shown which includes an aperture 54a in the form of a cylindrical bore through the wall of the member 39. The inner diameter of the circular bore forming the aperture 54a closely approximates the outer diameter of the spherical locking element 57a. The lock rod 60 includes a cam portion 64a having a spherical depression 66 which tapers off into a ramp 68. When the spherical locking element 57a is seated in the depression 66, and the stop flange 70 of the lock rod 60 abuts annular wall 71, the spherical element 57a is in a non-locking position which would allow the tubular shank 16 of a tool unit 10 to be inserted into the annular recess 59 of the coupling mechanism 43. However, when the lock rod 60 is moved to the right in the position illustrated, the ramp 68 of the cam portion 64a wedgingly engages and raises the spherical locking element 57a into the locking position. In such a position, the spherical locking element 57a will wedgingly and lockingly bear against an angled wall 30 of the tool unit 10.

While such a prior art locking mechanism has proven its capability of quickly, conveniently, and rigidly attaching a tool unit to a tool supporter, the applicant has observed that if the stroke of the lock rod could be shortened, the overall envelope of the clamping mechanism could likewise be shortened. Such a shortened tool envelope would facilitate machining operations by allowing the operator to more conveniently use the clamping mechanism without interference from surrounding tools or other obstructions. Even more importantly, a shorter lock rod stroke would reduce the stresses applied to the mechanism used to pull the lock rod from an unlocked to a locked position. Such a mechanism may take the form of a hydraulic cylinder connected to the lock rod, or a spring package comprised of a stack of resiliently compressed Bellville washers slidably mounted around the proximal end of the canister member. Where stacked Bellville washers are used, a shorter lock rod stroke would allow the use of a shorter stack of washers while increasing their useful life span. Alternatively, a regular size spring package of such washers could be used in combination with a shorter lock rod stroke to produce a clamping mechanism that gripped a tool unit with a greater holding force, which in turn would increase the tool rigidity and hence the accuracy of the machining operations performed by the tool unit.

Clearly, it would be highly advantageous if a way could be found to shorten the stroke of the lock rod used in such clamping mechanisms without sacrificing the convenience and speed that such a mechanism offers in attaching and detaching tool units to a tool supporter. Ideally, such a stroke-shortening solution should require only a minimal amount of modification to the shapes of existing parts so that a conventional clamping mechanism of the type previously described could easily be converted into an improved clamping mechanism with a minimum amount of component redesign and machining. It would also be desirable if such a stroke-shortening design resulted in equal or greater joint rigidity over the prior art. Finally, it would be desirable if such a stroke-shortening design was also capable of providing an increased clamping force between the clamping mechanism and the tool unit.

SUMMARY OF THE INVENTION

The invention is an improved lock rod clamping apparatus wherein the apertures of the canister member are elongated along the stroke axis of the lock rod for allowing the locking elements (which are preferably spheres) to move axially along the cam portions of the lock rod as well as radially such that the locking elements move into locking engagement with the tool unit with a shorter axial stroke of the lock rod.

In the preferred embodiment of the invention, the apertures of the canister member are elongated to a length between about 5% and 30% greater than the diameter of the locking spheres in a direction opposite from the ramp of the cam portions of the lock rod. At the same time, the position of the cam portions are moved in the direction of the elongation of the canister member apertures between about 5% and 30% of the original diameter of the apertures. These modifications of the clamping apparatus advantageously reduce the length of the lock rod stroke between about 5% and 30%. In a more preferred embodiment, the length of both the elongation of the apertures and the displacement of the cam portions is between about 15% and 25% of the original length of the apertures, which in turn shortens the stroke of the lock rod by 15% to 25%.

The invention further comprises angling the end walls of the apertures in the canister member between about 10° and 45° with respect to a line extending radially from the axis of reciprocation of the lock rod. Either or both of the end walls of the apertures may be angled. For the wall opposite the ramp of the cam portion, the angling is oriented toward the locking sphere; for the wall adjacent the ramp, the angling is oriented away from the locking sphere. The angling of the aperture wall opposite the ramp of the cam portions advantageously reduces the stroke of the lock rod an additional 5% to 25% over the amount the stroke is shortened by the elongation of the apertures. In the preferred embodiment, the angling of this aperture wall is between about 10° and 20° which results in a 22% to 34% total shortening of the lock rod stroke. The angling of the aperture wall nearest the ramp of the cam portions advantageously increases the gripping force of the clamping mechanism.

In the prior art, the wall of the tool unit and the aperture wall nearest the ramp of the cam portions present surfaces forming an angle. The locking sphere acts between these surfaces, and the lock rod surface to wedgingly engage the wall of the tool unit. When this aperture wall is angled toward a parallel position with the wall of the tool unit, then the mechanical advantage between these surfaces increases and the gripping force increases.

When the elongation of the apertures of the canister member is combined with the aforementioned preferred angling of the aperture walls, the stroke length of the lock rod can be reduced while increasing the gripping force between about 10% and 40%. Such a substantial stroke reduction allows the clamping apparatus to hold a tool unit within a smaller tool envelope, and with a smaller spring package. Because the aforementioned modifications lessen the amount of spring force necessary to achieve the same holding force as a conventional clamping mechanism a smaller spring package with longer lasting, spring elements (which are typically Bellville washers) may be used. Alternatively, a spring package of regular size and strength may be used to generate a substantially greater holding force out of the short stroke mechanism, which in turn provides greater tool rigidity and accuracy.

DETAILED DESCRIPTION OF THE PREFERRED EMBODIMENT

Figure 1:
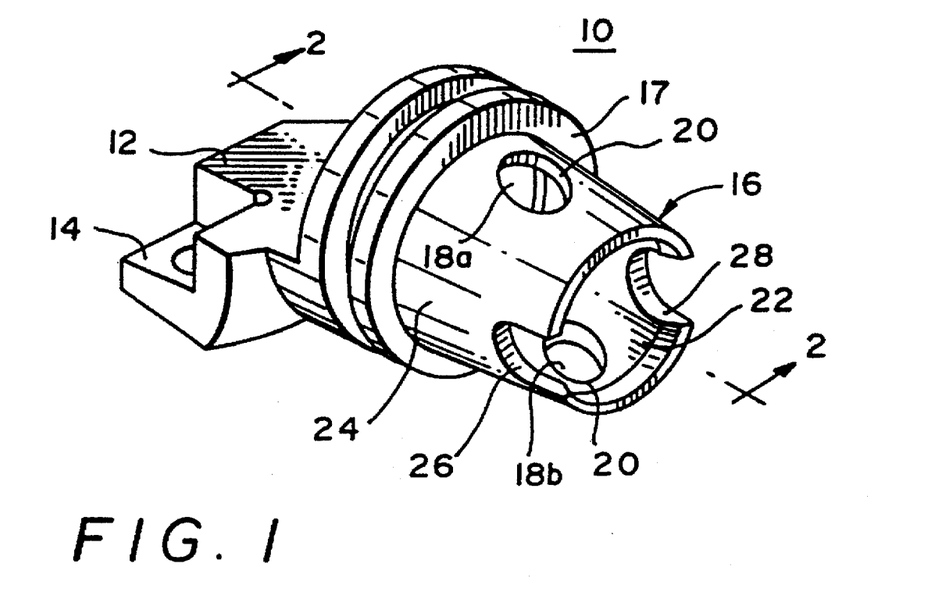
FIG. 1 is a perspective view of a tool unit of the type secured by the clamping mechanism of the invention.
Figure 2:
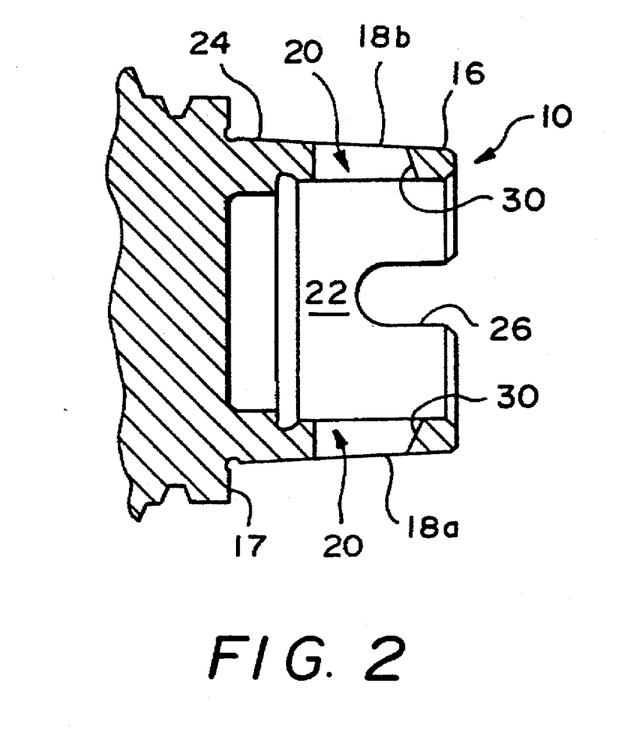
FIG. 2 is a cross-sectional side view of the tool unit illustrated in FIG. 1 along the line 2—2.

With reference now to FIGS. 1 and 2, the tool unit 10 used in conjunction with the clamping mechanism of the invention includes a forward end 12 for holding a cutting tool, and a rearward tubular shank 16 for connection to a tool supporter. The forward end 12 includes a recess or pocket 14 which is conventional in design for receiving an indexable cutting insert, locking bracket, and shim (not shown). At the junction between the forward end 12 and the tubular shank 16 is an annular abutment face 17 for engagement with the annular face of a tool supporter when the tool unit is connected to such a supporter by way of a clamping mechanism. The abutment face 17 is planar and is orthogonally oriented with respect to the longitudinal axis of the tubular shank 16.

As is indicated in FIG. 2, the tubular shank 16 is preferably integrally formed with the forward end 12 of the tool unit 10 from a single piece of steel, and has a frustro-conical shape. The shank 16 includes a pair of opposing openings 18a,b for receiving the spherical locking elements of the clamping mechanism which is described hereinafter. The walls 20 of the openings 18a,b are not cylindrical around their circumference, but instead include angled wall portions 30 (as shown in FIG. 2) for facilitating the locking engagement between the shank 16 and the spherical locking elements of the clamping mechanism. The inner surface 22 of the tubular shank 16 is substantially cylindrical in shape so as to closely mate with the outer surface of the canister member of the locking mechanism. The shank outer surface 24 is frustro-conical for the purposes of both centering and stiffening the coupling between the tool unit 10 and a tool supporter. Disposed orthogonally with respect to the opposing openings 18a,b are alignment slots 26 and 28. As will be explained, these slots 26,28 fit into protruding keys (not shown) present in the canister member 39 of the clamping mechanism to insure alignment between the openings 18a,b with the spherical locking elements of the clamping mechanism.

Figure 3:
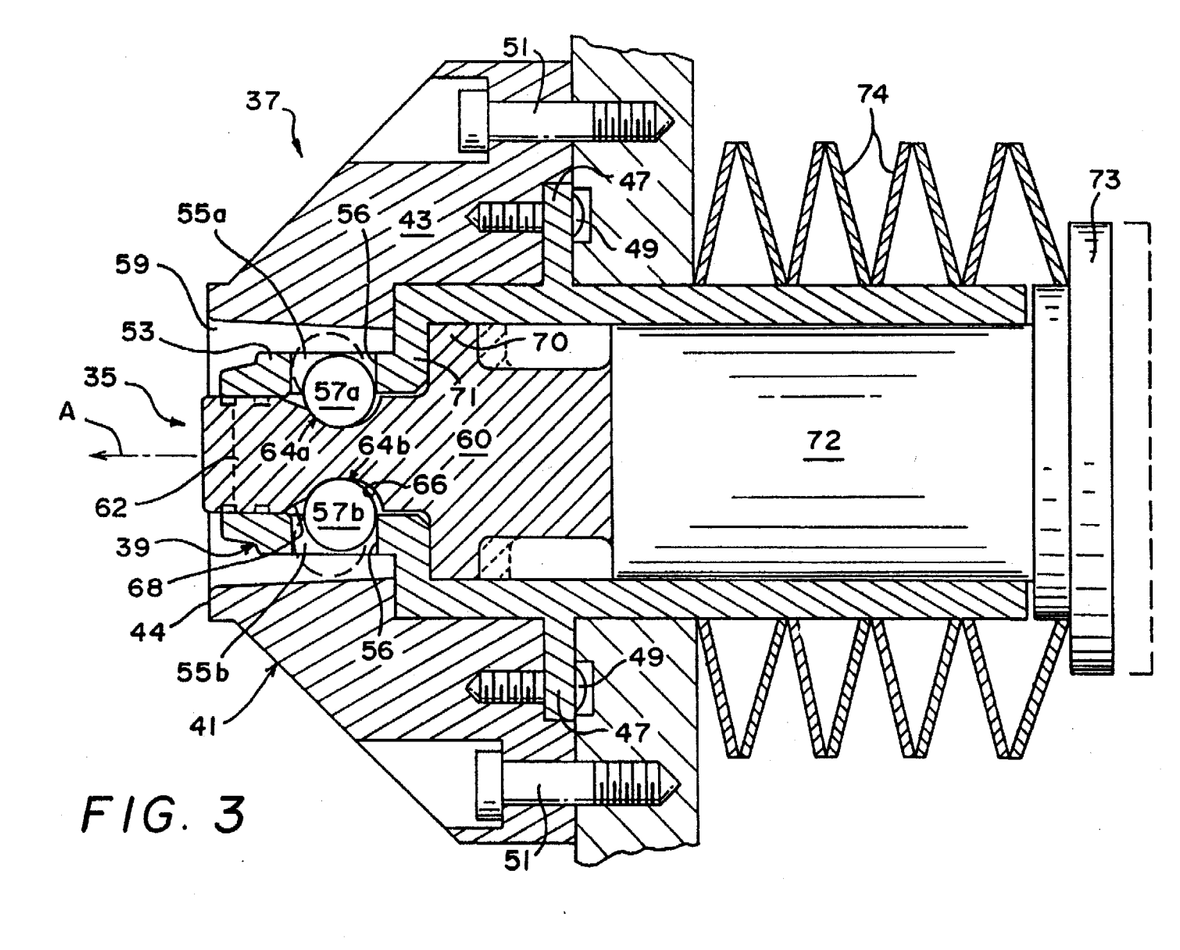
FIG. 3 is a side cross-sectional view of the clamping mechanism of the invention that detachably connects the tool unit of FIGS. 1 and 2 to a tool supporter.

With reference now to FIG. 3, the clamping mechanism 35 of the invention is disposed within a tool supporter 37 as shown. The clamping mechanism includes a cylindrically shaped canister member 39 mounted within a housing 41 formed from a frustro-conical coupling member 43. The coupling member 43 terminates, at its distal end, in an annular abutment face 44 that confronts the previously discussed abutment face 17 of the tool unit 10 when the two are connected. The tool supporter housing 37 further has a housing member 45 disposed behind the coupling member 43. The canister member 39 is affixed to the housing 41 by way of an annular flange 47 secured to the coupling member 43 by bolts 49. Coupling member 43 is in turn secured to the housing member 45 by means of bolts 51. Thus the canister member 39 remains stationary relative to the lock rod 60 during the operation of the clamping mechanism 35.

The distal end 53 of the canister member 39 include a pair of opposing apertures 55a,b for admitting locking elements in the form of spheres 57a,b in the position shown in phantom. It is important to note that the walls of the apertures 55a,b are not cylindrical bores having an inner diameter that is slightly larger than the outer diameter of the locking spheres 57a,b. Rather, they are oval slots formed by the addition of an elongated portion 56 on a side of the apertures 55a,b opposite to the distal end 62 of the lock rod 60 for a purpose that will become evident shortly. The distal end 53 of the canister member 39 also includes the previously mentioned pair of alignment lugs (not shown) disposed at right angles to the apertures 55a,b. A frustro-conically shaped socket 59 is defined between the outer surface of the distal end 62 of the canister member 39, and the inner surface of the coupling member 43 for receiving the tool unit 10.

In addition to the canister member 39 and locking spheres 57a,b, the clamping mechanism 35 of the invention further includes lock rod 60 which is reciprocally movable along an axis A into the position illustrated in phantom. The lock rod 60 has a distal end 62 concentrically disposed within and slidably movable with respect to the distal end 53 of the canister member 39. The distal end 62 includes opposing cam portions 64a,b for radially, and to some extent axially, moving the locking spheres 57a,b into and out of the socket 66. To this end, each of the cam portions 64a,b includes a depression 66 which is partially complementary in shape to the spheres 57a,b, and a ramp 68 extending from one side of the depression 66 toward the distal end 62 of the rod 60. In the invention, the axial position of the cam portions 64a,b is displaced from the distal end 62 of the lock rod 60 a distance equal to the axial length of the elongated portion 56 of each of the canister member apertures 55a,b. Lock rod 60 further has an integrally formed stop flange 70 that engages an annular wall 71 of the canister member to arrest the stroke of the .lock rod 60 in the distal direction. The proximal end of the lock rod 60 is formed from a cylindrical shaft 72 slidably mounted within the proximal end of the canister member 39. Shaft 72 terminates in a spring retainer 73. A spring package formed from stacked Bellville washers 74 constantly applies a tensile force to the spring retainer 73 that biases the lock rod 60 in the locking position illustrated in phantom.

The distal end of the lock rod 60 functions to physically bump the tool unit 10 from the coupling member 43 when the tool unit 10 is to be released. For that reason, if the tool unit 10 must be pushed out of the coupling member 43 for release, this distal end of the lock rod 60 must be positioned relative to the tool unit 10 for such contact.

The operation of the first embodiment of the clamping mechanism 35 will now be described with respect to FIGS. 4A, 4B, and 4C. In the first step of the clamping operation, illustrated in FIG. 4A, the tubular shank 16 of the tool unit 10 is aligned for mating engagement with the frustro-conical socket 59 of the tool supporter 37. Specifically, the slots 26,28 are aligned with the previously mentioned alignment lugs (not shown) present on the exterior of the distal end 53 of the canister member 39. The lock rod 60 is then pushed toward the distal end 53 of the canister member 39 with a force sufficient to overcome the spring bias of the stack of Bellville washers 74. This compresses the spring washers 74 and causes the stop flange 70 of the lock rod 60 to abuttingly engage the annular wall 71 of the canister member 39 as shown, which in turn allows locking spheres 57a,b to be completely received within the depression 66 of each of the cam portions 64a,b. In such a position, the locking spheres 57a,b will not interfere with the insertion of the tubular shank 16 of the tool unit into the socket 59.

Figure 4A:
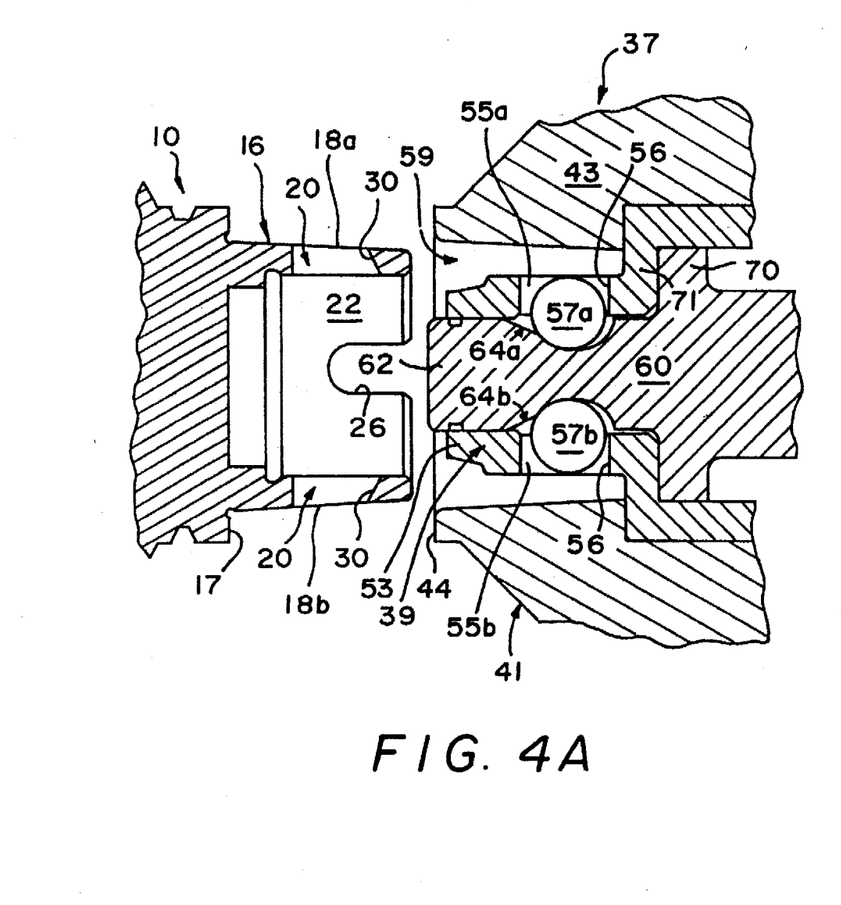
FIG. 4A, 4B, and 4C are cross-sectional side views illustrating how one embodiment of the clamping mechanism of the invention detachably secures a tool unit to a tool supporter.
Figure 4B:
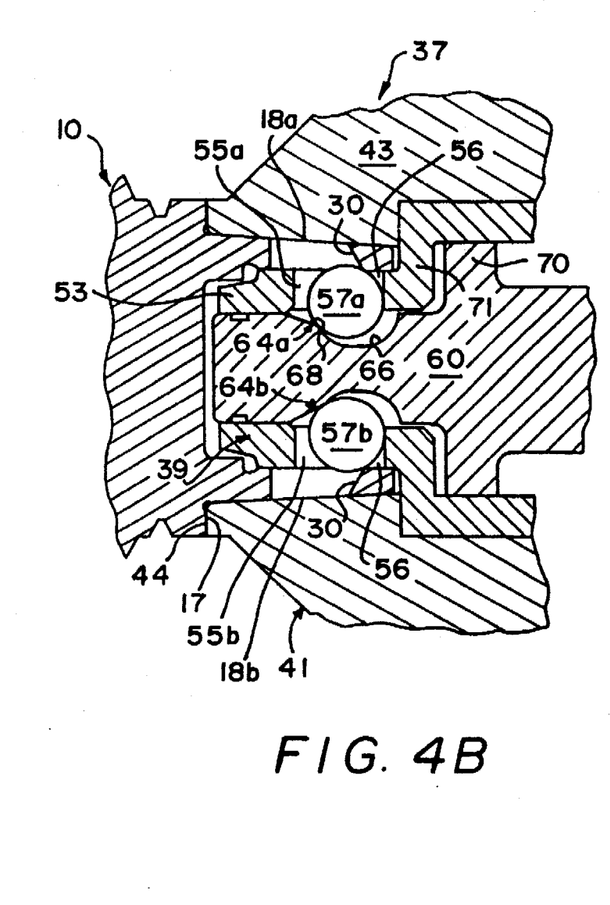

With reference now to FIG. 4B, the tubular shank 16 is inserted into the socket 59. The operator of the clamping mechanism 35 then releases the compressive force applied to the spring washers 74. The expanding spring washers 74 in turn withdraw the shaft 72 of the reciprocally movable lock rod 60 from the distal end 53 of the canister member 39. Upon such a withdrawal of the lock rod 60, the locking spheres 57a,b become engaged by the walls of the canister member 55a,b apertures opposite from the elongated portions 56 of these apertures. Such engagement unseats them from the spherical depression 66 of each of the cam portions 64a,b, and causes each of the locking spheres 57a,b climb the ramp 68 of each of the cam portions 64a,b. As the locking spheres 57a,b climb up the ramps 68 of their respective cam portions 64a,b, it is important to note that the elongated walls 56 of the canister member apertures 55a,b allow them to move axially as well as radially into engagement with the tapered wall 30 of the tool unit shank apertures 18a,b. Additionally, the axial travel of the locking spheres 57a,b is in a direction opposite to the axial travel of the lock rod 60. As will be demonstrated in more detail hereinafter, this has the advantageous effect of shortening the amount of lock rod stroke necessary for the rod 60 to move from an unlocking to locking position by a distance $X_1$ (shown in FIG. 7).

Figure 4C:
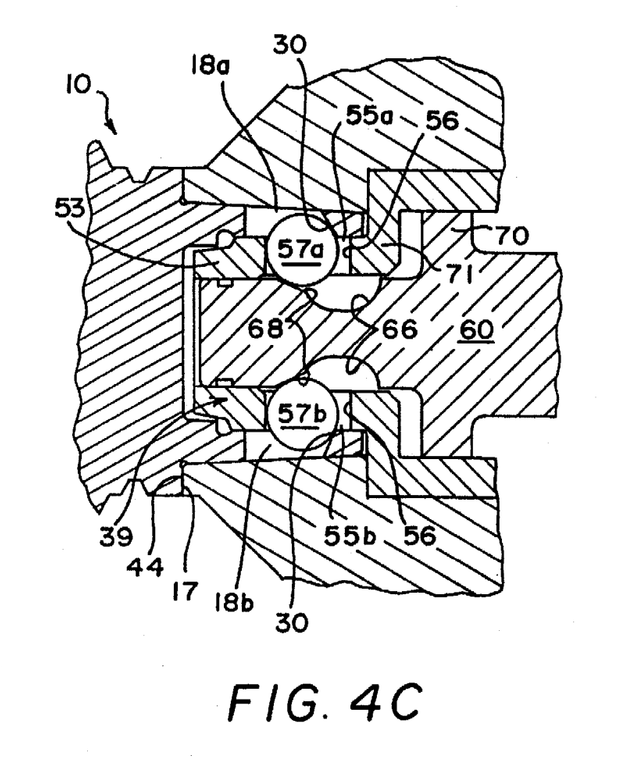

When the spring washers 74 finally pull the lock rod 60 into the lock position illustrated in FIG. 4C, the ramps 68 of each of the cam portions 64a,b firmly wedge these spheres into locking engagement between the wall defining the elongated portion 56 of the canister member apertures 55a,b and the angled wall 30 of each of the locking sphere receiving apertures 18a,b of the tool unit 10. In this position, the locking spheres 57a,b firmly grip the tool unit 10 to the canister member 39.

Figure 5A:
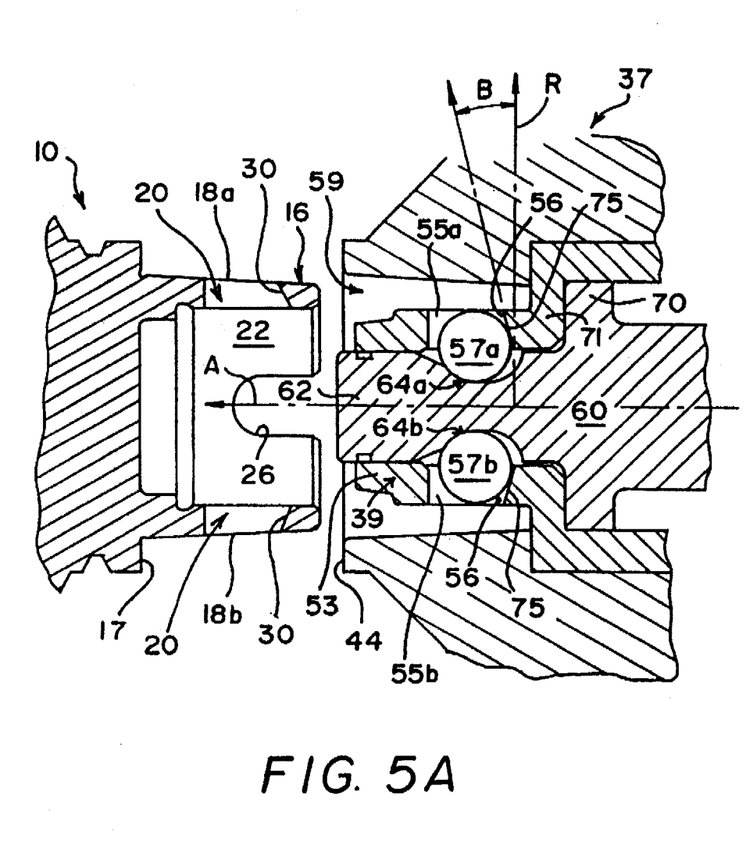
FIGS. 5A, 5B, and 5C illustrate how a second embodiment of the clamping mechanism of the invention detachably connects a tool unit to a tool supporter.
Figure 5B:
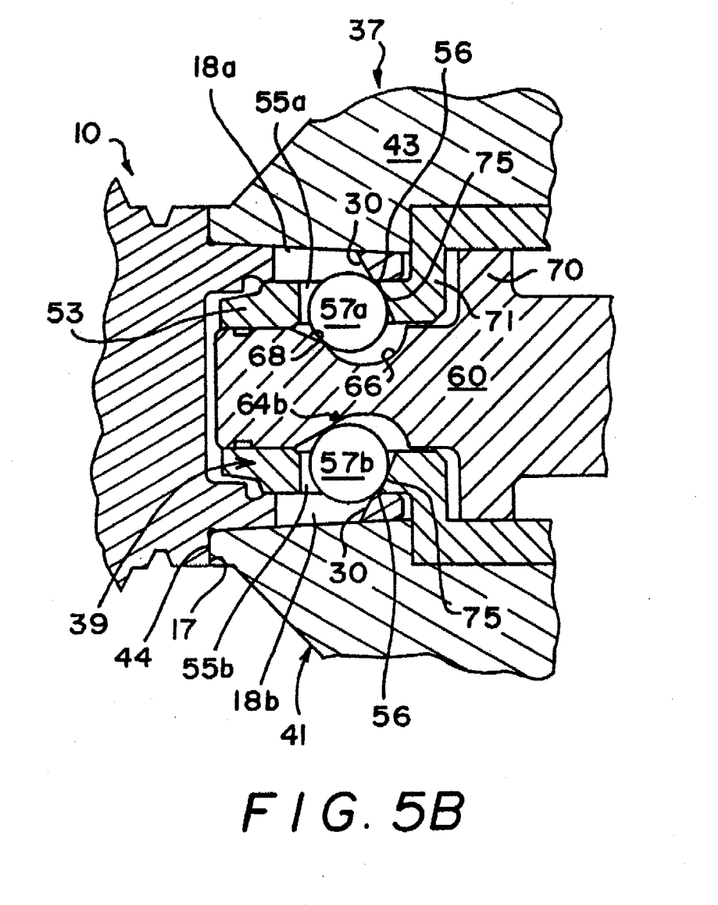
Figure 5C:
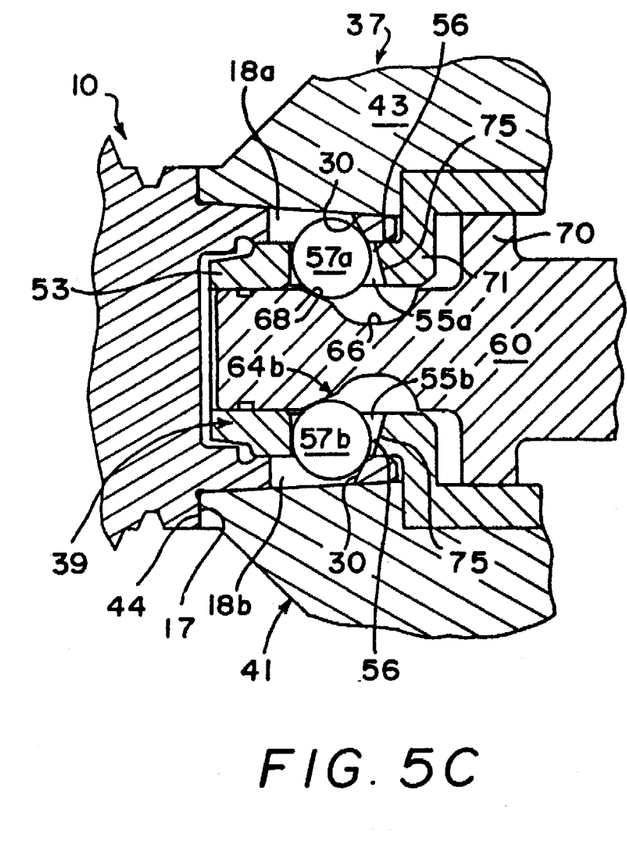

FIGS. 5A through 5C illustrate the operation of another embodiment of the invention. This embodiment is structurally identical to the embodiment illustrated in FIGS. 4A through 4C with the sole exception that the wall 75 of the canister member apertures 55a,b that defines the elongated portion 56 is angled toward its respective locking sphere. In the preferred embodiment, the wall 75 is tilted at an angle B between about 10° and 20° with respect to a line R that extends radially from the axis A of reciprocation, and most preferably 15°.

The embodiment illustrated in FIGS. 5A through 5C operates in exactly the same way as the embodiment described with respect to FIGS. 4A through 4C with the exception that the angling of the wall 75 of each of the canister member apertures 55a,b allows the spheres 57a,b to move an even greater distance axially along the ramps 68 of the cam portions 64a,b of the lock rod 60. This additional axial component of motion is approximately equal to the axial component $X_2$ (shown in FIG. 8) of the angle B from the tangent point between the locking spheres 57a,b and the angled walls 75. This increased component of axial motion of the locking spheres 57a,b significantly contributes to the shortening of the stroke of the lock rod 60, as will now be explained in detail.

Figure 7:
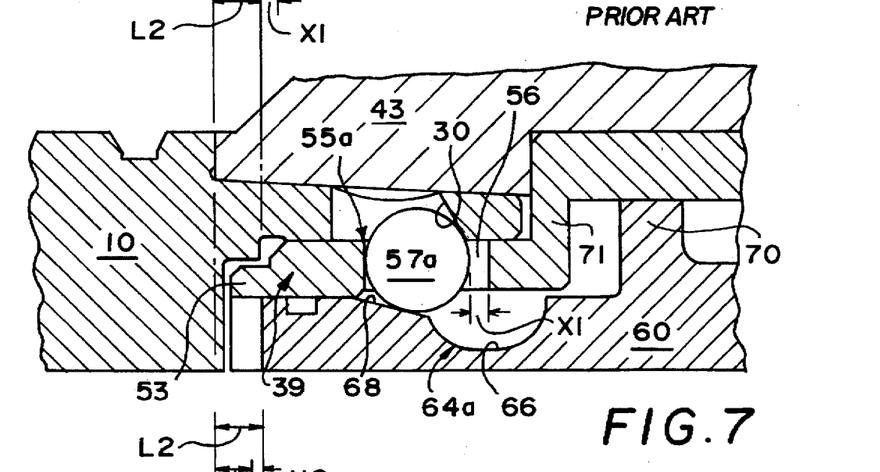
FIG. 7 is a partial enlarged cross-sectional side view of the canister member, spherical locking element, and cam portion of the lock rod of one embodiment of the clamping mechanism of the invention, illustrating the short stroke length $L_2$ of the lock rod necessary to bring the spherical locking element to a locking position.
Figure 8:
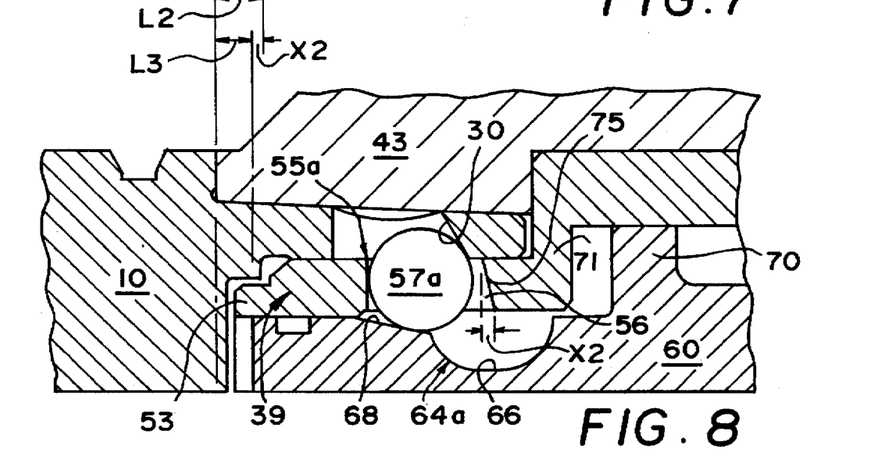
FIG. 8 is a partial enlarged cross-sectional side view of the canister member, spherical locking element, and cam portion of the lock rod of a second embodiment of the clamping mechanism of the invention, wherein one of the aperture walls is angled, illustrating the shorter stroke length $L_3$ of the lock rod necessary to bring the locking element to a locking position.

FIGS. 6, 7, and 8 compare the length of the lock strokes of a clamping mechanism of the prior art, and the first and second embodiments of the clamping mechanism 35 of the invention. In the prior art clamping mechanism shown in FIG. 6, the canister member apertures 54a,b (of which only 54a is shown) are circular in shape, having an inner diameter that is approximately the same size as the outer diameter of their respective locking spheres 57a,b. Consequently, the lock rod 60 must move an axial stroke distance $L_1$ in order to raise the locking spheres 57a,b into the locking position illustrated.

By contrast, in the first embodiment of the clamping mechanism 35 illustrated in FIG. 7, the apertures 55a,b in the canister member 39 have an elongated portion 56 as shown. The elongated portion 56 allows some movement of the locking spheres 57a,b in the axial direction, as well as the radial direction when the lock rod 60 is withdrawn to the position illustrated. The component of axial movement afforded by the elongated portion 56 allows the locking spheres 57a,b to engage the angled wall 30 of the tool unit 10 with a shorter stroke $L_2$ of the lock rod 60. In this embodiment, the length of the elongated portion 56 relative to the diameter of the locking spheres 57a,b may be approximately 20%, which in turn results in an approximately 20% reduction in the length of the stroke $L_2$ relative to the length of the lock rod stroke $L_1$ of a prior art clamping mechanism. It should be noted that the shorter lock rod 60 stroke necessitates a modification to the lock rod 60 if the lock rod 60 is to bump the tool unit 10. The distal end of the lock rod 60 will be a greater distance from the cam portion 66 by an amount approximately equal to the reduced stroke of the lock rod 60. This is to permit the lock rod 60 to contact and bump the tool unit 10 for release.

In the second embodiment of the invention illustrated in FIG. 8, the angling of the wall 75 that defines the edge of the elongated portion 56 of the canister member apertures 55a,b results in a widening of the aperture an additional distance $X_2$ from the tangent point between the sphere 57a and the angled wall 75 to the bottom of this wall. Such a widening allows an even greater amount of axial movement to occur with the locking spheres 57a,b as the lock rod 60 is withdrawn which in turn results in an even shorter lock rod stroke $L_3$ to get the locking spheres 57a,b into the working position illustrated. When the wall 75 is angled approximately 15° with respect to a line extending radially from the longitudinal axis A, the lock rod stroke $L_1$ can be reduced an additional 8% over the 20% reduction achieved by solely elongating the apertures 55a,b. Thus the lock rod stroke $L_3$ of the embodiment illustrated in FIG. 8 is approximately 28% shorter than the lock rod stroke $L_1$ of a conventional clamping mechanism, and may be shortened by as much as 37%. It should again be noted that the shorter lock rod 60 stroke necessitates a modification to the lock rod 60 if the lock rod is to bump the tool unit. The distal end of the lock rod 60 should be an even greater distance from the cam portion 66 by an amount approximately equal to the reduced stroke of the lock rod 60.

Figure 9:
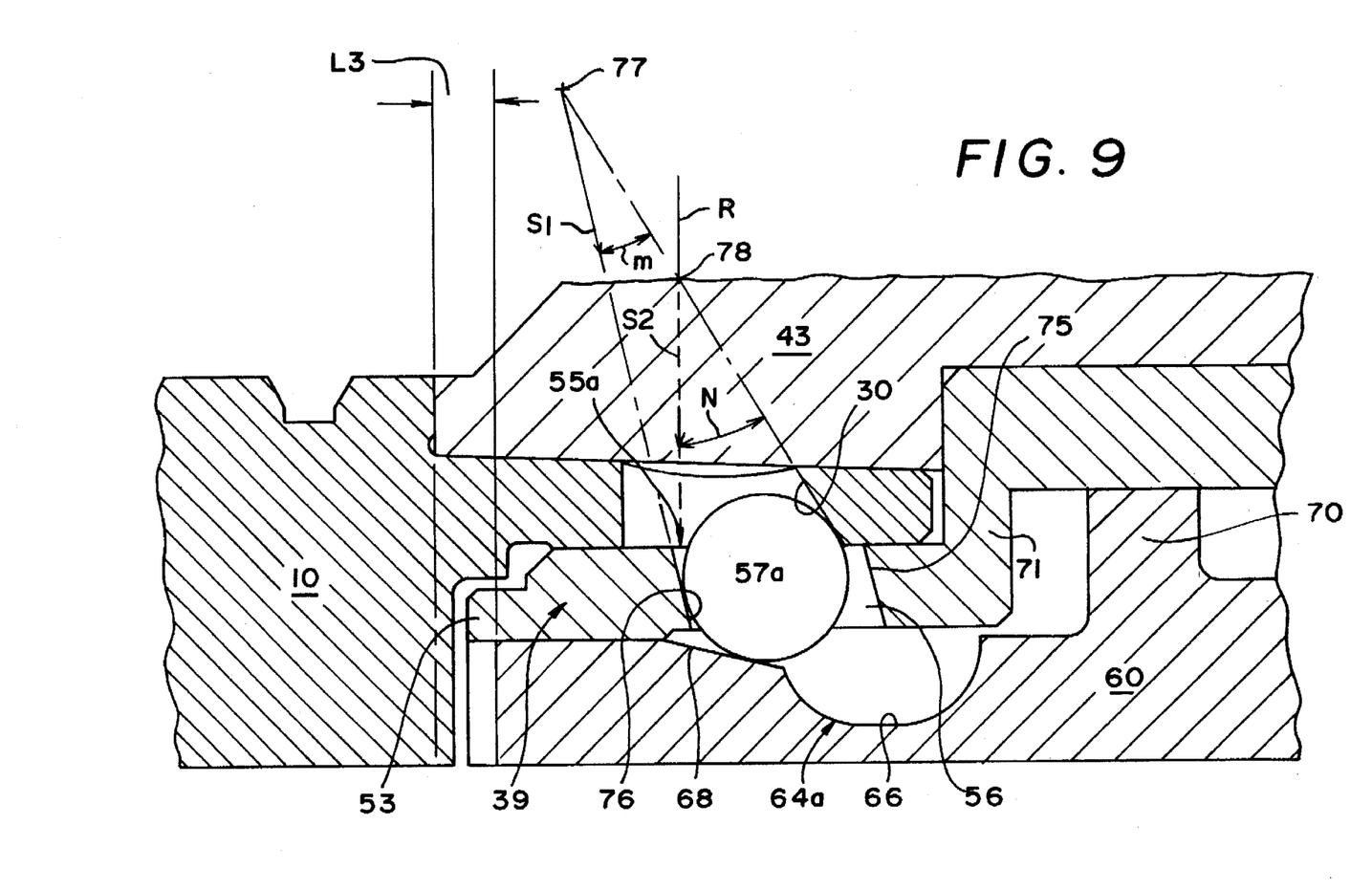
FIG. 9 is a partial enlarged cross-sectional side view of the canister member, spherical locking element, and cam portion of the lock rod of a third embodiment of the clamping mechanism of the invention wherein both sides of the aperture walls are angled, illustrating how increased gripping force is achieved while maintaining a short lock rod stroke.

While each of the embodiments discussed so far has illustrated a design intended to shorten the lock rod stroke, a fourth embodiment shown in FIG. 9 retains this benefit but additionally provides an increase in clamping force. This is accomplished by tilting the aperture wall 76, which is opposite aperture wall 75. In this embodiment the aperture wall 76 of each of the elongated canister apertures 55a,b is tilted similarly to the aperture wall 75. More specifically, wall 76 is tilted at an angle between about 10° and 20°, preferably 15°, with respect to line R which extends radially from the longitudinal axis A. Such a tilting of the aperture wall 76 has the advantage of increasing the gripping force of the clamping mechanism 35 while sacrificing only a small length of lock rod 60 travel from L3 to L4.

The increased clamping force is best understood with reference to angles M and N shown in FIG. 9. Where the locking sphere 57a is pushed radially outwardly into the locked position illustrated in FIG. 9, its spherical walls engage both the angle portion 30 of the aperture walls of the tool unit 10 and the tilted wall 76 of the elongated aperture 55a at an angle M. Angle M is defined by the projection of lines from aperture wall 76 and the tapered portion of the tool unit aperture walls 30. This projection intersects at origin 77.

On the other hand, angle N is defined by line R, which reflects the previous orientation of aperture wall 76 and the tapered portion of the tool unit aperture walls 30. The locking sphere 57a wedgingly engages these surfaces, by forced displacement from the ramp 67 of the lock rod 60. Since angle M is smaller than angle N, the locking sphere 57a generates a greater mechanical advantage between those surfaces defined by angle M than those defined by angle N. This modified arrangement provides a clamping force on the order of 30% higher than that clamping force generated with the original arrangement.

This arrangement may involve removing a portion of the originally perpendicular aperture wall 76. If this occurs, then the lock rod 60 travel may be increased slightly by the amount X3 shown in FIG. 9. However, there will still be an overall reduction in lock rod 60 stroke from that of the FIG. 6 prior art.

Figure 10A:
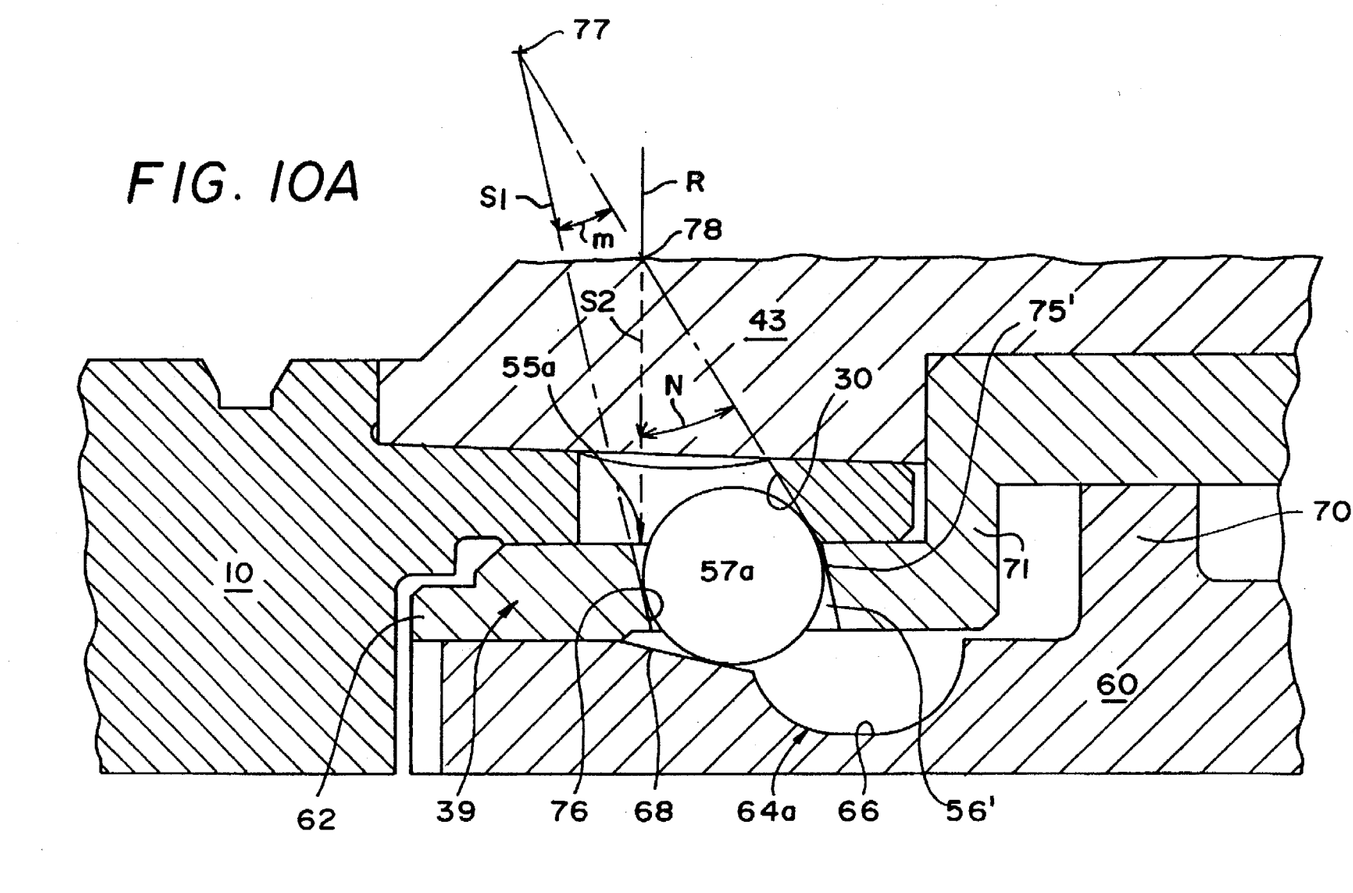
FIG. 10A is a partial enlarged cross-sectional side view of a fourth embodiment of the invention which is similar to the FIG. 9 embodiment in that both sides of the aperture walls are angled, but wherein the apertures are not elongated.

FIG. 10A illustrates still another embodiment of the invention wherein both sides 76 and 75' of the walls of the apertures 55a,b are angled, but wherein the apertures 55a,b are not as elongated as in the FIG. 9 embodiment. Here, the only elongation that occurs is from the angling of the wall 75'. While the shortening of the lock rod stroke may not be quite as much as the relatively short length $L_3$ achieved by the embodiment illustrated in FIG. 9 wherein the wall 75 is both angled and displaced longitudinally, this particular embodiment of the invention has the advantage of being relatively easy to manufacture.

Figure 10B:
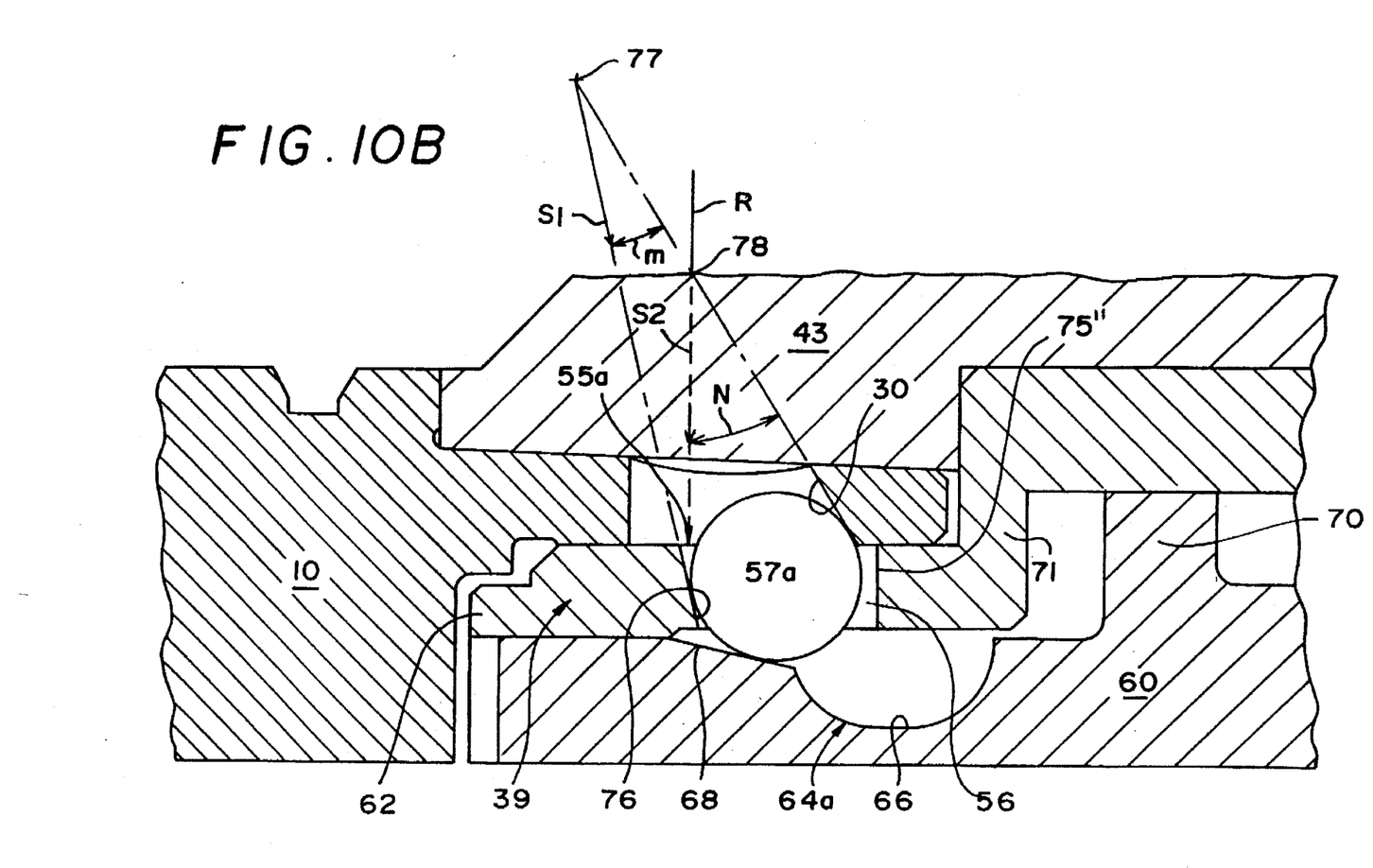
FIG. 10B is a partial enlarged cross-sectional side view of a fifth embodiment which is similar to the FIG. 9 embodiment, with the exception that only one side of the aperture walls is angled.

FIG. 10B illustrates still another embodiment of the invention wherein the apertures 55a,b are elongated, but wherein the wall 55" of each aperture closest to the cam portions 64a,b of the lock rod 60 is not angled, in contrast to the embodiment illustrated in FIG. 9. While this embodiment likewise results in a lock rod stroke that is somewhat longer than the shortened stroke $L_3$ associated with the FIG. 9 embodiment, it does maintain the advantage of an increased gripping force by virtue of the angling of the aperture wall 76.

Although this invention has been described with respect to three preferred embodiments, various modifications, revisions, and additions will become evident to persons of ordinary skill in the art. All such revisions, modification, and additions are intended to be encompassed within the scope of this invention, which is limited only by the claims appended hereto.

What is claimed is:

1. A clamping apparatus for detachably connecting a tool unit to a tool supporter comprised of:

at least one locking element;

a canister member that is matable with a tool unit and which includes an aperture for admitting the locking element, a lock rod that is reciprocally movable a stroke distance along a longitudinal axis and having a cam portion including a depression for receiving the locking element in a non-locking position, and a ramp on one side of said depression for moving the locking element radially with respect to the axis through the canister aperture from an unlocked position into locking engagement with a wall of the tool unit, wherein a side of the aperture of the canister member closest to the depression of the cam portion is elongated parallel to the longitudinal axis from a cylindrical shape conforming to the locking element to an elongated shape thereby defining at least one elongated side for allowing the locking element to move axially within the aperture and axially along the cam portion as well as radially such that the locking element moves from an unlocking position into locking engagement with the tool unit with a shorter axial stroke distance of the lock rod than that stroke required for an aperture having a cylindrical shape conforming to the locking element, and wherein said aperture includes a side opposite from the elongated side that is angled with respect to a line projecting radially from the longitudinal axis for increasing the force of wedging and locking engagement between the locking element and the wall of the tool unit by increasing the mechanical advantage between the locking element and the tool unit wall.

2. The clamping apparatus of claim 1, wherein the elongation of the aperture is between 5% and 30% of the length of the locking element along the axis.

3. The clamping apparatus of claim 2, wherein the elongation of the aperture is between about 17% and 23% of the length of the locking element along the axis.

4. The clamping apparatus of claim 3, wherein the elongation of the aperture is 20% of the length of the locking element along the axis.

5. The clamping apparatus of claim 1, wherein the cam portion of the lock rod is displaced along the axis in a direction opposite from the ramp of the cam portion for a distance equal to the length of the elongation of the aperture.

6. The clamping apparatus of claim 1, wherein the elongated wall of the elongated canister aperture is angled at an acute angle with respect to a line projecting radially from the axis for allowing the locking element to move into locking engagement with the tool unit with a shorter axial stroke movement of the lock rod.

7. The clamping apparatus of claim 6, wherein the acute angle is between about 5° and 20° with respect to the radial line.

8. A clamping apparatus for detachably connecting a tool unit to a tool supporter, wherein the clamping apparatus is of the type having a canister member that is matable with a tool unit and which includes circular apertures for admitting spherical locking elements, the diameter of the apertures closely approximating the diameter of the spherical locking elements, and a lock rod having a reciprocating stroke along an axis and including cam portions including depressions for receiving the locking elements in a non-locking position, and ramps on one side of the depressions for moving the spherical locking elements radially with respect to the axis through the apertures and the canister member into locking and unlocking engagement with a wall of the tool unit, wherein the improvement comprises:

an elongation of the circular apertures of the canister member in a direction parallel to the axis of a side closest to the depressions of the cam portions that creates an elongated side in each aperture for allowing the spherical locking elements to move axially within the apertures and along the cam portions as well as radially such that the spherical locking elements move into locking engagement with the tool unit wall with a shorter axial stroke of the lock rod than if the apertures where of a cylindrical shape, and a side in each of the apertures that is opposite from the elongated side and angled with respect to a line projecting radially from the longitudinal axis for increasing the force of wedging and locking engagement between said spherical locking element and said wall of the tool unit by increasing the mechanical advantage between the locking element and the tool unit wall.

9. A clamping apparatus for detachably connecting a tool unit to a tool supporter, wherein the clamping apparatus is of the type having a canister member that is matable with a tool unit and which includes circular apertures for admitting spherical locking elements, the diameter of the apertures closely approximating the diameter of the spherical locking elements, and a lock rod having a reciprocating stroke along a longitudinal axis and including cam portions having ramps for moving the spherical locking elements radially with respect to the axis through the apertures and the canister member into locking and unlocking engagement with a wall of the tool unit, wherein the improvement comprises:

an elongation of the circular apertures of the canister member in a direction parallel to the axis that creates an elongated side in each aperture for allowing the spherical locking elements to move axially along the cam portions as well as radially such that the spherical locking elements move into locking engagement with the tool unit wall with a shorter axial stroke of the lock rod than if the apertures were of a cylindrical shape, and a side in each of said apertures that is opposite from said elongated side and angled with respect to a line projecting radially from said longitudinal axis for increasing the force of wedging and locking engagement between said spherical locking element and said tool unit by increasing the mechanical advantage between the locking element and said tool unit wall.

10. The clamping apparatus of claim 9, wherein the elongated side of each of the apertures is angled at an acute angle with respect to a line orthogonal to the longitudinal axis for allowing the spherical locking elements to move into locking engagement with the tool unit with an even shorter axial stroke of the lock rod than if the side was not angled.

11. The clamping apparatus of claim 10, wherein the acute angle is between about 10° and 45° with respect to a line R perpendicular to the longitudinal axis.

12. The clamping apparatus of claim 9, wherein the elongated side of each aperture of the canister member is opposite from the ramp of the cam portion of the lock rod and the angled side of each aperture is adjacent to the ramp of the cam portion of the lock rod.

13. A clamping apparatus for detachably connecting a tool unit to a tool supporter, wherein the apparatus is of the type having a canister member that is matable with a tool unit, and a lock rod having a reciprocable stroke along a longitudinal axis and cam portions for moving locking element radially with respect to the axis through apertures in the canister member into locking and wedging engagement with the tool unit, wherein each of the cam portions includes a depression for receiving a locking spherical element, and a ramp on one side of the depression for radially moving the locking element;

wherein the sides defining the axial ends of the canister apertures are orthogonal with respect to the axis, wherein the improvement comprises:

angling both of the sides of each aperture with respect to a line orthogonal to said longitudinal axis such that each aperture is lengthened along the axis for allowing the locking elements to move axially along the cam portions as well as radially such that the locking elements move into locking and wedging engagement with a shorter axial stroke of the lock rod, and a side of each aperture closest to the ramp of said cam portion of said lock rod increases the force of wedging and locking engagement between said locking element and said tool unit by engaging said locking element at a mechanically more advantageous angle.

14. The clamping apparatus of claim 13 further comprising an elongation of each of the apertures in the canister member along the axis for allowing the locking elements to move axially along the cam portions of the lock rod such that the locking elements move into locking engagement with the tool unit with a shorter axial stroke of the lock rod.

* * * * *

UNITED STATES PATENT AND TRADEMARK OFFICE
CERTIFICATE OF CORRECTION

PATENT NO. : 5,694,820
DATED : December 9, 1997
INVENTOR(S) : Robert Erickson et al.

It is certified that error appears in the above-identified patent and that said Letters Patent is hereby corrected as shown below:

Column 5, line 22, delete "distal end 62 of the canister member 39" and add --distal end 53 of the canister member 39--.

Column 5, lines 33-34, delete "the socket 66" and add --the depression 66--.

In the drawings, sheet 8, Figure 10A, delete reference numeral "62" and insert --53--.

In the drawings, sheet 9, Figure 10B, delete reference numeral "62" and insert --53--.

Signed and Sealed this

Thirty-first Day of March, 1998

Attest:

BRUCE LEHMAN

Attesting Officer       Commissioner of Patents and Trademarks